United States Patent Office 3,480,650
Patented Nov. 25, 1969

3,480,650
DIHYDROPYRANYL POLYESTERS
Josef Sikora, St. Hilaire, Quebec, Canada, assignor to Canadian Industries Limited, Montreal, Quebec, Canada, a corporation of Canada
No Drawing. Filed May 31, 1966, Ser. No. 553,665
Claims priority, application Great Britain, July 6, 1965, 28,574/65
Int. Cl. C08g 17/14, 53/08
U.S. Cl. 260—345.8   3 Claims

ABSTRACT OF THE DISCLOSURE

Dihydropyranyl group-terminated polyesters formed by ester exchange between a dialkyl ester of a phthalic acid and both an aliphatic polyol and a dihydropyranyl monohydric alcohol or an ester of a dihydropyranyl monohydric alcohol. The polyesters comprise an inner segment containing both phthalic acid and aliphatic polyol residues, the inner segment being terminated by dihydropyranyl alcohol residues. The polyesters are useful as ingredients of foamed cellular polymeric materials.

---

This invention relates to dihydropyranyl polyesters and to a process for preparing the same.

In British Patent No. 991,970 to W. D. S. Bowering, N. B. Graham and J. D. Murdock there are described foamable compositions of a novel type comprising a vinyl ether containing at least two vinyl groups per molecule, a foaming agent and an acidic catalyst. Optionally said foamable compositions may contain a compound reactive with said vinyl ether such as a phenol, an alcohol, an epoxidized material, a polycarboxylic acid, a polyamide or a polycarbamate. By variation of the vinyl ether-reactive compound, it is possible to modify the reactivity and fluidity of the compositions to suit desired operating conditions. However, the vinyl ether-reactive ingredients, being structurally different from the vinyl ether ingredient, alter the nature of the foaming reaction. In addition, the need to employ extra ingredients in the foaming compositions requires a more complex foam preparation procedure.

It has now been found that polyester derivatives of cyclic vinyl ethers can be prepared in which the structure of the molecule can be varied so as to modify the properties of foamed cellular polymeric materials employing said polyesters as ingredients. Said polyester compounds comprise an ester intermediate segment constituted by the reaction product of an aliphatic polyhydric alcohol and a lower alkyl ester of an aromatic polycarboxylic acid, said intermediate segment being terminated by cyclic vinyl ether rings. By variation of the structure of the intermediate segment the reactivity and physical properties of the vinyl ether compound can be modified. In this manner the properties of the foaming compositions can be tailored to the desired type of operation and type of foam.

It is thus an object of this invention to provide novel cyclic vinyl ethers useful as ingredients in foamable compositions. A further object is to provide cyclic vinyl ethers whose structures can be designed to suit particular applications of said ethers. Additional objects will appear hereinafter.

The novel cyclic vinyl ether polyesters of this invention comprise compounds having the generic formulas

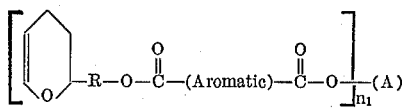
(A)

and

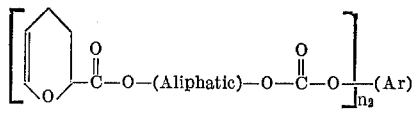
(Ar)

where $n_1$ and $n_2$ are integers having values of at least 2, R is a lower aliphatic radical, Aromatic is a divalent aromatic radical, Aliphatic is a divalent aliphatic radical, A is a linking aliphatic radical having a valence equal to $n_1$ and Ar is a linking aromatic radical having a valence equal to $n_2$.

The novel cyclic vinyl ether polyesters of this invention are prepared by means of esterification reactions between an aliphatic polyhydric alcohol, a lower alkyl ester of an aromatic polycarboxylic acid and a cyclic vinyl ether carrying a hydroxyl or carboxylic ester functional group.

In the preferred process for the preparation of the cyclic vinyl ether polyesters of this invention dihydropyranyl methanol and dimethyl phthalate are reacted with an aliphatic polyhydric alcohol in a single step employing an ester exchange catalyst. The by-product methanol is separated from the polyester product by distillation.

In an alternative but less preferred process, the reaction is carried out in two steps. In the first step, a vinyl ether constituted by two dihydropyranyl rings linked by a single ester linkage is reacted with dimethyl phthalate in an ester-ester interchange reaction to produce the methyl ester of dihydropyranyl carboxylic acid and a mixed ester-methyl, dihydropyranyl methyl phthalate. The methyl ester of dihydropyranyl carboxylic acid is separated by distillation and residual mixed phthalate ester is then reacted in an ester-alcohol interchange step with an aliphatic polyhydric alcohol to produce methanol and the dihydropyranyl group terminated polyester. The methanol is separated from the polyester by distillation. Both ester exchange reactions are carried out in the presence of an ester exchange catalyst.

In a specific embodiment of the two step process, 3,4-dihydro-2H-pyran - 2 - methyl-(3,4-dihydro-2H-pyran-2-carboxylate) and dimethyl orthophthalate in molar ratios in the range 5.17:3.35 to 2.85:5.30 are reacted in the first step in the presence of an ester-exchange catalyst, thus forming mixed methyl, dihydropyranyl esters of orthophthalic acid and methyl 3,4-dihydro-2H-pyran-2-carboxylate, the reaction mixture being maintained at a temperature in the range 170° C. to 180° C. and at a pressure such that the methyl 3,4-dihydro-2H-pyran-2-carboxylate separates by distillation from the other ingredients of the reaction mixture. In the second step, the remaining methyl ester ingredients of the reaction mixture are reacted in the presence of an ester exchange catalyst with an aliphatic polyol selected from the group consisting of ethylene glycol, polypropylene glycols and oxypropylated hexanetriols in proportions such that the methyl ester ingredients undergo an ester exchange reaction to form methanol and a mixture of polyesters containing residues of orthophthalic acid, 3,4-dihydro-2H-pyran-2-methylol and aliphatic polyol, the reaction mixture being maintained at a temperature of about 120° C. and at a pressure such that the methanol separates by distillation from the other ingredients of the reaction mixture.

Alternatively the three ingredients, dimethyl phthalate, an aliphatic polyhydric alcohol and a vinyl ether constituted by two dihydropyranyl rings linked by a single ester linkage can react in a single step employing an ester exchange catalyst.

It has been found that the products of ester exchange reactions between dimethyl orthophthalate and (a) a dihydropyranyl compound selected from the group consisting of 3,4-dihydro-2H-pyran-2-methylol and 3,4-dihydro-2H-pyran-2-methyl-(3,4-dihydro - 2H - pyran - 2 - carboxylate) and (b) an aliphatic polyol selected from the group consisting of ethylene glycol, polypropylene glycols and oxypropylated hexanetriols wherein the molar ratio of reactants (a) and (b) lies in the range 2.85:4.5 to 4.5:0.5 constitute a mixture of polyesters wherein the component polyesters consist essentially of segments which are the residues of orthophthalic acid, 3,4-dihydro-2H-pyran-2-methylol and aliphatic polyols.

The proportions of ingredients may be varied to produce a polyester of desired structure provided that the resulting polyester has a large proportion of dihydropyranyl rings.

Examples of cyclic vinyl ethers suitable as ingredients for the preparation of the polyesters of this invention include 3,4-dihydro-2H-pyran-2-methylol (dihydropyranyl methanol) of formula

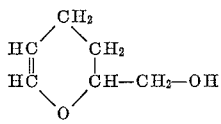

3,4-dihydro - 2H - pyran - 2 - methyl-(3,4-dihydro-2H-pyran-2-carboxylate) of formula

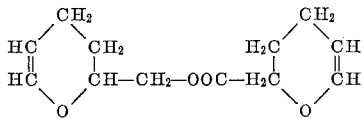

and 3,4-dihydro-5-methyl - 2H - pyran-2-methyl-(3,4-dihydro-2H-pyran-2-carboxylate) of formula

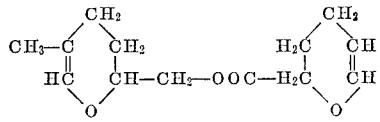

Suitable lower alkyl esters of aromatic polycarboxylic acids are dimethyl phthalate, diethyl phthalate, dimethyl terephthalate, tetramethyl pyromellitate and trimethyl trimellitate.

Aliphatic polyhydric alcohols suitable as ingredients for the preparation of polyesters of this invention include ethylene glycol, 1,5-pentanediol, glycerol, 1,2,6-hexanetriol, polypropylene glycols, castor oil, sugar alcohols, and polyether condensates of polyhydric alcohols and olefin oxides such as the polypropylene oxide condensates of hexa hydroxy sugar alcohols and propylene oxide.

Catalysts suitable for the esterification reactions of this invention include sodium metal, sodium methoxide, magnesium dihydropyranyl methoxide, tetraisopropyl titanate and sodium alkoxides of aliphatic polyhydric alcohols, such as 1,2,6-hexanetriol.

When the cyclic vinyl ether terminated polyesters of this invention are employed as ingredients in foamable compositions in admixture with a foaming agent and a catalyst, foamed cellular polymeric materials having commercially desirable properties are obtained. By choice of a suitable intermediate segment in the polyester the properties of the foamed products can be varied. For example polyesters derived from short chain dihydric alcohols, such as ethylene glycol, usually provide hard foams. When a polyhydric alcohol having a molecular weight over about 1000 is employed as ingredient in the polyester preparation flexible foams can be obtained. By similar modification of the polyester structure the viscosity of the foamable compositions can be modified. By choice of an inexpensive segment ingredient lower cost foams can be obtained.

Since the cyclic vinyl ether terminated polyesters of this invention polymerize in the presence of a catalyst to form a solid resin the polyesters also have utility as adhesives and protective coatings.

The invention will be more fully illustrated by the following examples, but it is to be understood that its scope is not to be limited to the specific embodiments shown.

EXAMPLE 1

770 grams of dimethyl phthalate (4 moles) and 900 grams (ca. 4 moles) of 3,4-dihydro-2H-pyran-2-methyl-(3,4-dihydro-2H-pyran-2-carboxylate) were placed in a two liter flask fitted with a Vigreux column 6 inches long and 1 inch in diameter and leading to a receiver, a thermoregulator, an agitator, and a side arm sealed with a rubber serum cap. The pressure in the flask was controlled by means of a manostat. The flask was heated with a heating mantle. The low boiling components of the ingredients were distilled off until the flask temperature reached 150° C. at 15 mm. mercury pressure. The distillate weighed 24.4 grams.

During a period of 1½ hours, while the flask temperature remained between 170° C. and 180° C., and pressure was 32 mm. mercury, 55 cc. of a 25% solution of sodium methoxide in methanol were added in 5 cc. portions from a syringe inserted through the rubber serum cap. During this period, 706 grams of a product comprising mainly methyl dihydropyran-2-carboxylate were distilled off.

To the reaction product in the flask were added 93 grams (1½ moles) of ethylene glycol and the mixture was heated at 120° C. while gradually reducing the pressure from 160 mm. mercury to 15 mm. mercury at such rate that the ethylene glycol did not distill off. In 1¼ hours, the reaction was complete. During this period 30 cc. of sodium methoxide solution were added to the flask and 724 grams of dihydropyranyl polyester product were obtained, being a rather viscous liquid.

A foam was prepared from a mixture of the above product (20.0 grams) and 3,4 - dihydro - 2H - pyran - 2-methyl - (3,4 - dihydro - 2H - pyran - 2-carboxylate) (20.0 grams), trichloromonofluoromethane (7.5 grams), siloxane oxyalkylene copolymer type silicone surfactant (0.2 gram) and boron trifluoride etherate/ether/trichloromonofluoromethane mixture (1:1:3 by volume) (4.0 cc.). The foam had a density of 1.82 lb./cu. ft., was somewhat friable but had a good skin and did not disintegrate after after 15 days in boiling water.

EXAMPLE 2

1 mole of dimethyl phthalate, 1.5 mole of 3,4-dihydro-2H - pyran - 2 - methyl - (3,4 - dihydro - 2H - pyran - 2-carboxylated) and 2.0 grams of sodium metal were charged into a flask of the type employed in Example 1. The ingredients were agitated while the low boiling components (18.4 grams) distilled off until the temperature reached 130° C. at 5 mm. mercury pressure. The temperature of the flask was then raised to 150°-170° C. when a reaction took place accompanied by the distilling off of 210 grams of material in 1 hour and 10 minutes. At this time the catalyst appeared to be exhausted. 8 cc. of a 25% solution of sodium methoxide in a methanol were then added by syringe through the rubber serum cap giving an additional 65 grams of distillate.

The product remaining in the flask comprised 201 grams of liquid having a viscosity of 46 poises and 28.5 grams of a semi solid which readily settled out from the liquid.

EXAMPLE 3

A series of preparations were carried out using the apparatus and procedure described in Example 1. In the ester-ester interchange step 3,4 - dihydro - 2H - pyran - 2-methyl dihydropyran-2-carboxylate being distilled off. In with dimethyl phthalate in the presence of a catalyst, the methyl disydropyran-2-carboxylate being distilled off. In the ester-alcohol interchange step a polyol was reacted with the residual product. The reactions are described in Tables I and II.

TABLE I—ESTER-ESTER INTERCHANGE STEP

[The composition of the distillate was determined by gas liquid chromatography]

| | 3,4-dihydro-2H-pyran-2-methyl-(3,4-dihydro-2H-pyran-2-carboxylate), moles | Low boiling fraction distilled from 3,4-dihydro-2H-pyran-2-methyl-(3,4-dihydro-2H-pyran-2-carboxylate), moles | Residual 3,4-dihydro-2H-pyran-2-methyl-(3,4-dihydro-2H-pyran-2-carboxylate), moles | Dimethyl phthalate, moles | Sodium consumed in reaction, grams | Sodium methoxide solution (25% in methanol) consumed in reaction, cc. | Total weight of distillate, grams | Methyl dihydropyran-2-carboxylate in distillate, moles | Percent of theoretical yield of methyl dihydropyran-2-carboxylate, percent [1] | Dimethyl phthalate in distillate, moles | 3,4-dihydro-2H-pyran-2-methyl-(3,4-dihydro-2H-pyran-2-carboxylate) in distillate, moles |
|---|---|---|---|---|---|---|---|---|---|---|---|
| A | 2.00 | 0.07 | 1.93 | 2.00 | 3.59 | | 264 | 1.68 | 88 | 0.10 | 0.016 |
| B | 2.00 | 0.07 | 1.93 | 2.00 | 2.08 | 9.0 | 304 | 1.68 | 93 | 0.225 | 0.12 |
| C | 6.00 | 0.18 | 5.82 | 4.00 | 1.12 | 34.2 | 863 | 4.10 | 79 | 0.65 | 0.65 |
| D | 4.50 | 0.17 | 4.33 | 4.50 | 1.28 | 24.0 | 660 | 3.40 | 81 | 0.68 | 0.11 |
| E | 3.00 | 0.14 | 2.86 | 6.00 | 1.20 | 28.3 | 461 | 2.22 | 78 | 0.70 | 0.01 |

[1] The yield of methyl dihydropyran-2-carboxylate is shown as a percentage of 3,4-dihydro-2H-pyran-2-methyl-(3,4-dihydro-2H-pyran-2-carboxylate) residual, less amount in the distillate.

TABLE II—ESTER-ALCOHOL INTERCHANGE STEP

| | Polyol | Amount of polyol, moles | Sodium methoxide consumed, cc. | Methanol recovered, moles | Dihydropyranyl methanol recovered, moles | Weight of product, grams | Percent w./w. of semi-solids in product, percent | Viscosity of product, poises | Reaction time (ester-ester interchange and ester-alcohol interchange), hours |
|---|---|---|---|---|---|---|---|---|---|
| A | {LHT-112, PPG-1025} | {0.33, 0.5} | 9.0 | 1.88 | 0.41 | 1,410 | 5.0 | 46 | 1 |
| B | Niax LHT-67 | 0.66 | 11.0 | 1.90 | 0.41 | 1,677 | | 54 | 1¾ |
| C | Ethylene Glycol | 0.6 | 6.8 | 1.0 | 0.32 | 1,144 | 4.4 | 13 | 2 |
| D | do | 2.0 | 10.0 | 3.4 | | 1,125 | 6.8 | 148 | 2 |
| E | do | 4.5 | 8.2 | 7.0 | 0.41 | 1,301 | 5.2 | 98 | 2 |

PPG-1025 = Polypropylene glycol of 1,025 molecular weight and average hydroxyl number (mg. KOH/gm.) 110.
LHT-67 = Oxypropylated hexanetriol of 2,500 molecular weight and average hydroxyl number (mg. KOH/gm.) 67.
LHT-112 = Oxypropylated hexanetriol of 1,500 molecular weight and average hydroxyl number (mg. KOH/gm.) 112.

Employing the dihydropyranyl polyester products of the present example as series of foams was prepared. Each foamable composition contained:

Dihydropyranyl polyester product of present example,
Trichloromonofluoromethane (5 cc.),
Siloxane oxyalkylene copolymer type silicone surfactant (0.2 cc.).
Catalyst: aqueous fluoboric acid (50% by weight) or boron etherate dissolved in ethyl ether and trichloromonofluoromethane in proportion of 1:1:3 parts by volume and optionally 3,4-dihydro-2H-pyran-2-methyl - (3,4-dihydro-2H-pyran - 2 - carboxylate) methyl dihydropyran-2-carboxylate.

The compositions were mixed vigorously in 250 cc. plastic cups. The compositions and resulting foams are shown in Table III, the source of the dihydropyranyl polyester ingredient being shown by reference to Table I and II.

EXAMPLE 4

291 grams (1.5 moles) of dimethyl phthalate, 1250 grams (0.5 mole) of polypropylene glycol of molecular weight 2500 and 1008 grams (4.5 moles) of 3,4-dihydro-2H-pyran-2-methyl-(3,4-dihydro-2H-pyran - 2 - carboxylate) were charged into the reaction vessel of the type described in Example 1. The pressure was reduced to 6 mm. of mercury and the reaction mixture was heated until the temperature reached 140° C. During this time 10.0 grams of material distilled off.

3.84 grams of sodium metal and 2 cc. of 25% solution of sodium methoxide in methanol were added to the reaction mixture. The reaction mixture was stirred vigorously and heated at 140°–150° C. while the pressure in the vessel was reduced slowly from 70 to 3 mm. of mercury at such a rate that the 3,4-dihydro-2H-pyran-2-methyl-(3,4-dihydro-2H-pyran-2-carboxylate) did not distill over. The distillate contained 1.16 moles of methyl dihydropyran-2-carboxylate, 0.54 mole of dihydropyranyl methanol, 0.024 mole of 3,4-dihydro-2H-pyran-2-carboxaldehyde and 1.32 moles of methanol.

TABLE III

| Dihydropyranyl polyester | Amount of dihydropyranyl polyester, grams | 3,4-dihydro-2H-pyran-2-methyl-(3,4-dihydro-2H-pyran-2-carboxylate), grams | Methyl dihydropyran-2-carboxylate, grams | Catalyst | Amount of catalyst, cc. | Induction time, minutes | Rise time, minutes | Temperature at start of rise, °C. | Cure time (minutes)/temperature (°C.) | Comment |
|---|---|---|---|---|---|---|---|---|---|---|
| A | 30 | 10 | | FB | 1.0 | ¼ | 1 | | 5/130 | Flexible. |
| A | 30 | 10 | | BE | 3.0 | 1¼ | 2¼ | 42 | 20/75 | Do. |
| A | 30 | 5 | 5 | BE | 3.0 | 1¼ | 2 | 44 | 10/25 | Do. |
| B | 30 | 10 | | FB | 1.0 | 1⅓ | 1½ | 46 | | Do. |
| B | 30 | 5 | 5 | FB | 0.75 | 1½ | 2⅓ | 52 | 30/80 | Soft, flexible. |
| C | 40 | | | FB | 0.2 | 2½ | 3¾ | 36 | 20/80 | |
| C | 30 | | 10 | FB | 0.6 | | | | 960/80 | Hard. |
| D | 40 | | | FB | 0.7 | 2½ | 2¾ | | | Do. |
| D | 40 | | | FB | 0.5 | ½ | 1½ | 33 | 30/80 | Soft. |

FB = Aqueous fluoboric acid (50% by weight).
BE = Boron trifluoride etherate/ethyl ether/trichloromonofluoromethane (1:1:3 by volume).

The reaction product remaining in the reaction vessel was a liquid with viscosity of 22 poises.

The aforesaid reaction product was mixed with trichloromonofluoromethane foaming agent and boron trifluoride etherate catalyst to give flexible foams having good tear strength and high resiliency. These foams were equivalent to those prepared from dihydropyranyl polyesters made by the two stage process.

EXAMPLE 5

1.5 moles of dimethyl phthalate, 0.5 mole of polypropylene glycol of molecular weight 2500 and 4.5 mole of 3,4-dihydro-2H-pyran-2-methyl - (3,4 - dihydro - 2H-pyran-2-carboxylate) were charged into a reaction vessel of the type described in Example 1. The pressure of the vessel was reduced to 3 mm. mercury and the reaction mixture heated to distill off the low boiling components, the temperature rising to 130° C. 3.84 grams of sodium metal were then added to the reaction mixture but no methanol distilled over. However, when 7 cc. of 25% solution of sodium methoxide in methanol were added a reaction commenced. Once initiated the reaction proceeded smoothly giving in 45 minutes at 110° C. 1.25 moles of methanol, 0.35 mole of methyl dihydropyran-2-carboxylate and 0.28 mole of dihydropyranyl methanol.

The temperature of the reaction mixture was then raised to 140°–150° C. An additional 8 cc. of sodium methoxide solution were then added and in 1 hour 1.10 mole of methyl dihydropyran-2-carboxylate and 0.55 mole of dihydropyranyl methanol distilled over.

The dihydropyranyl polyester product remaining in the reaction vessel was a liquid of viscosity of 40 poises weighing 2060 grams. When employed as ingredient of a foaming composition containing trichloromonofluoromethane and boron trifluoride etherate soft flexible foams were obtained.

EXAMPLE 6

2.5 moles of dimethyl phthalate, 5 moles of 3,4-dihydro-2H-pyran-2-methyl-(3,4-dihydro - 2H - pyran - 2-carboxylate) and 0.83 mole of polypropylene glycol of molecular weight 2500 were charged into a reaction vessel of the type used in Example 1. The low boiling components of the reaction mixture were first distilled off and then 2.14 grams of sodium metal were added. The reaction was carried out in two stages as in Example 5, the total reaction time being about 2 hours. During the reaction 19 cc. of sodium methoxide solution (25% in methanol) were added to the reaction mixture, while there were distilled over 2.44 moles of methyl dihydropyran-2-carboxylate, 1.2 mole of dihydropyranyl methanol and 2.0 moles of methanol (allowance being made for the methanol content of the catalyst solution).

The product in the reaction vessel comprised 2131 grams of liquid having a viscosity of 81 poises and 53 grams of a semi solid which readily settled out from the liquid.

The liquid was employed as an ingredient in foaming compositions including trichloromonofluoromethane and boron trifluoride etherate. The foams resulting were flexible with fine cell structure. When the products of Examples 5 and 6 were blended and employed in analogous foaming compositions the foams obtained were more resilient than when the product of Example 6 was employed alone.

EXAMPLE 7

582 grams of dimethyl phthalate, 637 grams of polypropylene glycol of molecular weight 425, 513 grams of dihydropyranyl methanol and 15 cc. of 25% commercial sodium methoxide solution in methanol were heated to 120° C. at 110 mm. mercury pressure in a flask adapted for vacuum distillation and for addition of catalyst under vacuum. During a period of 3 hours, while additional sodium methoxide solution was added at intervals in 10 cc. portions and 183.3 grams of methanol distilled over into the cold traps, the pressure in the flask was gradually reduced to 3 mm. mercury. At the end of the reaction the flask temperature was raised to 150° C. and the unreacted dihydropyranyl methanol (153 grams) was distilled off.

The reaction product remaining in the flask was a dark liquid having a viscosity of 63 poises at room temperature.

A series of four foams was prepared, employing as ingredients in each foam, 40 grams of the reaction product, 5 cc. trichloromonofluoromethane, 0.2 cc. siloxane oxyalkylene copolymer type silicone surfactant and as catalyst 5 cc. of a 20% by volume solution of boron trifluoride etherate in polypropylene glycol of molecular weight 425. In two foams an additional ingredient dihydropyran-2-carboxylic acid n-butyl ester was employed in the amounts shown in Table IV.

The ingredients with the exception of the catalyst were blended rapidly for 30 seconds in a 250 ml. paper cup. The temperature of the mixture was recorded and 5 cc. of the catalyst were added in a single portion and blended in the mixture for 15 seconds. The temperature was then measured and the mixture was set aside to foam. When foaming commenced the temperature was recorded again. The characteristics of foaming are shown in Table IV.

TABLE IV

| Foam | Dihydropyran-2-carboxylic acid n-butyl ester, grams | Induction period, min. | Rise period, min. | Period of cure at 100° C., min. | Height of foam, in. | Before adding catalyst, °C. | After adding catalyst, °C. | At beginning of foam rise, °C. |
|------|---|---|---|---|---|---|---|---|
| A | 0 | 1¼ | 1 | | | 28 | 31 | 37 |
| B | 0 | 1 | 1 | 60 | | 28 | 33 | 36 |
| C | 5 | 2 | 1¼ | 30 | 7¼ | 26 | 28 | 33 |
| D | 10 | 2¼ | | 20 | 6¼ | 25 | 27 | 30 |

The foams when freshly prepared had tacky skins but the skins became satisfactory after curing in an oven at 100° C. Foam A collapsed on standing which suggests that curing improves the mechanical strength of the product. All the four foams were soft and flexible and were characterized by rather slow recovery from deformation. Foam D, prepared from a dihydropyranyl polyester and dihydropyran-2-carboxylic acid n-butyl ester, changed shape only slightly after remaining 4 days in boiling water. In distinction, foams prepared from the diester of polypropylene glycol (MW 425) and dihydropyran-2-carboxylic acid disintegrated under such test conditions.

What I claim is:

1. A mixture of polyesters wherein the component polyesters consist essentially of segments which are the residues of orthophthalic acid, 3,4-dihydro-2H-pyran-2-methylol and aliphatic polyols, said polyesters comprising the products of ester exchange reactions between dimethyl orthophthalate and (a) a dihydropyranyl compound selected from the group consisting of 3,4-dihydro-2H-pyran-2-methylol and 3,4-dihydro-2H-pyran-2-methyl-(3,4-dihydro-2H-pyran-2-carboxylate), and (b) an aliphatic polyol selected from the group consisting of ethylene glycol, polypropylene glycols and oxypropylated hexanetriols, provided that the molar ratio of reactants (a) and (b) lies in the range of 2.85:4.5 to 4.5:0.5.

2. A process for preparing mixtures of dihydropyranyl group-containing polyesters which comprises (1) reacting 3,4-dihydro-2H-pyran-2-methyl-(3,4-dihydro-2H - pyran-2-carboxylate) and dimethyl orthophthalate in molar ratios in the range 5.17:3.35 to 2.85:5.30 in the presence of an ester exchange catalyst, thus forming mixed methyl, dihydropyranyl esters of orthophthalic acid and methyl 3,4-dihydro-2H-pyran-2-carboxylate, the reaction mixture being maintained at a temperature in the range 170° C. to 180° C. and at a pressure such that the methyl 3,4-dihydro-2H-pyran-2-carboxylate separates by distillation from the other ingredients of the reaction mixture, and (2) reacting the remaining methyl ester ingredients of the reaction mixture in the presence of an ester exchange catalyst with an aliphatic polyol selected from the group consisting of ethylene glycol, polypropylene glycols and oxypropylated hexanetriols, in proportions such that the methyl ester ingredients undergo an ester exchange reaction to form methanol and a mixture of polyesters containing residues of orthophthalic acid, 3,4-dihydro-2H-pyran-2-methylol and aliphatic polyol, the reaction mixture being maintained at a temperature of about 120° C. and at a pressure such that the methanol separates by distillation from the other ingredients of the reaction mixture.

3. A process as claimed in claim 2 wherein the ester exchange catalyst is sodium methoxide.

References Cited

UNITED STATES PATENTS

| | | | |
|---|---|---|---|
| 3,032,558 | 5/1962 | Montagna et al. | 260—345.8 |
| 3,158,585 | 11/1964 | Kelso et al. | 260—345.8 |
| 3,197,320 | 7/1965 | Graham et al. | 260—345.8 |
| 3,206,479 | 9/1965 | Sax | 260—345.8 |
| 3,318,824 | 5/1967 | Graham | 260—345.8 |

NORMA S. MILESTONE, Primary Examiner

U.S. Cl. X.R.

260—75, 2.5